US008857612B2

(12) United States Patent
Crank et al.

(10) Patent No.: US 8,857,612 B2
(45) Date of Patent: Oct. 14, 2014

(54) LENGTH-ADJUSTABLE CHAIN CARRYING DEVICE

(71) Applicants: Bradley G. Crank, Sterling, KS (US); Melissa A. Crank, Sterling, KS (US)

(72) Inventors: Bradley G. Crank, Sterling, KS (US); Melissa A. Crank, Sterling, KS (US)

( * ) Notice: Subject to any disclaimer, the term of this patent is extended or adjusted under 35 U.S.C. 154(b) by 154 days.

(21) Appl. No.: 13/628,199

(22) Filed: Sep. 27, 2012

(65) Prior Publication Data

US 2014/0084124 A1 Mar. 27, 2014

(51) Int. Cl.
*B23Q 13/00* (2006.01)

(52) U.S. Cl.
USPC ... 206/349; 206/348; 248/292.12; 248/316.8; 248/682

(58) Field of Classification Search
CPC ........ B25B 11/00; B23Q 13/00; B27B 17/00; B27B 17/0008; B27B 17/14; B65D 73/0014; B65D 85/02
USPC .......... 206/207, 348, 349; 248/292.12, 316.8, 248/682; 269/86, 103, 130, 131
See application file for complete search history.

(56) References Cited

U.S. PATENT DOCUMENTS

| | | | | |
|---|---|---|---|---|
| 1,728,106 | A * | 9/1929 | Collins | 242/577 |
| 2,541,080 | A * | 2/1951 | Lyon | 198/816 |
| 4,369,575 | A | 1/1983 | Schurman | |
| 4,805,889 | A * | 2/1989 | Liepse | 269/210 |
| 4,905,948 | A * | 3/1990 | Indorf | 248/309.1 |
| 5,129,510 | A * | 7/1992 | Wright | 206/6.1 |
| 5,425,444 | A * | 6/1995 | Chapman | 206/6.1 |
| 5,662,220 | A | 9/1997 | Schruman | |
| 5,924,642 | A * | 7/1999 | Krebs et al. | 242/400.1 |
| 6,049,986 | A * | 4/2000 | Calkins et al. | 30/386 |
| 6,237,228 | B1 * | 5/2001 | Moody | 30/381 |
| 7,032,749 | B2 | 4/2006 | Hochstetler et al. | |
| 7,624,862 | B1 * | 12/2009 | Pleggenkuhle | 206/349 |
| 2005/0139499 | A1 * | 6/2005 | Flynn | 206/349 |
| 2013/0264236 | A1 * | 10/2013 | Sublett | 206/349 |

FOREIGN PATENT DOCUMENTS

WO WO 2012160422 A1 * 11/2012

* cited by examiner

*Primary Examiner* — Terrell McKinnon
*Assistant Examiner* — Eret McNichols
(74) *Attorney, Agent, or Firm* — Dale J. Ream

(57) ABSTRACT

A length adjustable chain carrying device includes a base member having a fixed length. First and second adjustment members are positioned on an upper surface of the base member and configured to move linearly thereon. An actuator is rotatably mounted to the base member upper surface and situated intermediate the first and second adjustment members, the actuator being operatively coupled to the first and second adjustment members and configured to move the first and second adjustment members in opposite linear directions along the base upper surface when actuated. The chain carrying device includes first and second chain holding members coupled to distal ends of the first and second adjustment members, respectively. Each first and second chain holding member includes an upstanding cylindrical configuration defining a plurality of slots configured to receive a chain thereabout.

8 Claims, 5 Drawing Sheets

LENGTH-ADJUSTABLE CHAIN CARRYING DEVICE

CROSS REFERENCE TO RELATED APPLICATION

This non-provisional patent application claims the benefit of provisional application Ser. No. 61/548,746 filed on Oct. 19, 2011, titled Length-Adjustable Chain Carrying Device.

BACKGROUND OF THE INVENTION

This invention relates generally to chain and chainsaw blade carriers and, more particularly, to a length-adjustable chain carrying device that is particularly suited to carry multiple chains simultaneously without the chains becoming tangled.

An operator of a chainsaw often desires to have extra chainsaw blades on hand in case one chain breaks or becomes dull. Extra chains are often carried in the back of a pickup, kept in a box or tool chest or perhaps merely in a pile on a work bench. Unfortunately, it is easy and common for extra chains/chainsaw blades to become entangled when stored in a haphazard manner such that frequent operation of the chainsaw may become frustrating and undesirable.

Various devices have been proposed in the art for storing and transporting chainsaw blades or, more generally, chains. Although assumably effective for their general purposes, the existing chain carriers do not provide a device configured to simultaneously carry multiple chainsaw cutting chains or are not easily length adjustable to accommodate chains of different lengths.

Therefore, it would be desirable to have a chain carrying device that is configured to hold multiple chains simultaneously. Further, it would be desirable to have a chain carrying device that is length adjustable so as to be useful to owners of various types and sizes of chainsaws. In addition, it would be desirable to have a chain carrying device having structures to keep multiple chains from becoming tangled or snagged relative to one another.

SUMMARY OF THE INVENTION

A length adjustable chain carrying device according to the present invention includes a base member having a fixed length. First and second adjustment members are positioned on an upper surface of the base member and configured to move linearly thereon. An actuator is rotatably mounted to the base member upper surface and situated intermediate the first and second adjustment members, the actuator being operatively coupled to the first and second adjustment members and configured to move the first and second adjustment members in opposite linear directions along the base upper surface when actuated. The chain carrying device includes first and second chain holding members coupled to distal ends of the first and second adjustment members, respectively. Each first and second chain holding member includes an upstanding cylindrical configuration defining a plurality of slots configured to receive a chain thereabout.

Therefore, a general object of this invention is to provide a chain carrying device configured to carry multiple chainsaw chains and to keep them organized and untangled.

Another object of this invention is to provide a chain carrying device, as aforesaid, that is length adjustable so that chains of various lengths may be stored.

Still another object of this invention is to provide a chain carrying device, as aforesaid, having a rack and pinion gear apparatus for adjusting the length of the carrying case.

Yet another object of this invention is to provide a chain carrying device, as aforesaid, that is easily portable, easy to use, and has a casing that is durable.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
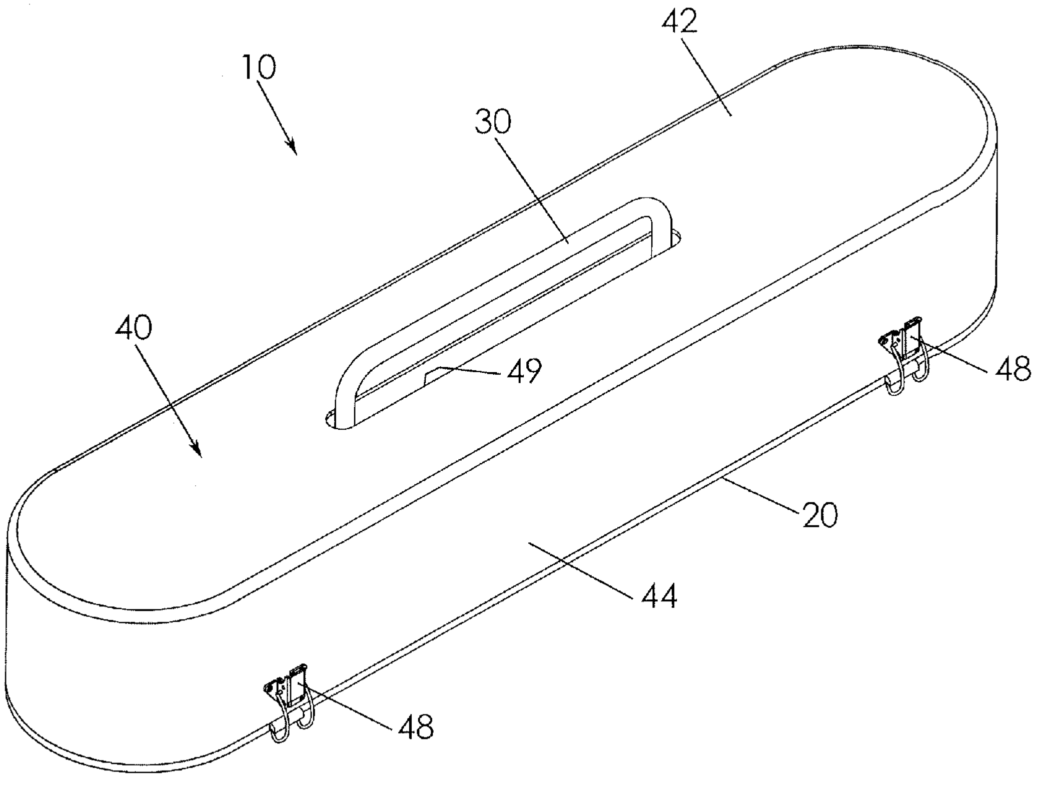
FIG. 1 is a perspective view of a chain carrying device according to a preferred embodiment of the present invention.

A chain carrying device according to a preferred embodiment of the present invention will now be described in detail with reference to FIGS. 1 to 5 of the accompanying drawings.

The chain carrying device 10 includes a base member 20 having first 24 and second 26 ends and having a fixed length. The base member 20 may be a panel having a generally planar configuration with rounded ends. The base member 20 may also define a plurality of apertures 28 or small slots adjacent side and end edges for receiving complementary fasteners of a carrying case 40, as described below. The base member 20 includes a handle 30 extending upwardly from an upper surface 22.

The carrying case 40 may include a top wall 40 and a plurality of side walls extending downwardly from respective peripheral edges of the top wall 40. Preferably, the top wall 40 of the carrying case 40 includes a configuration complementary to that of the base member 20. Having rounded ends, the carrying case 40 may be viewed as having a continuous side wall 42 depending from the top wall 40. A plurality of spaced apart fastener inserts 46 may be coupled to or integrally formed along a lower peripheral edge of the side wall 42, each insert 46 having a configuration complementary to a respective aperture 28 in the base member 20 so as to be received therein when the case 40 is selectively coupled thereto. The base member 20 may include one or more flanges 32 and the carrying case 40 may include an equal number of fasteners 48, such as latches, configured to be selectively coupled to the flanges 32 in order to secure the case 40 to the base member 20 (FIG. 1). The top wall 40 also defines a slot 49 having a configuration complementary to an upper end of the handle 30 such that the handle 30 may be received therethrough when the case 40 is fastened to the base member 20 (FIG. 1).

Figure 2:
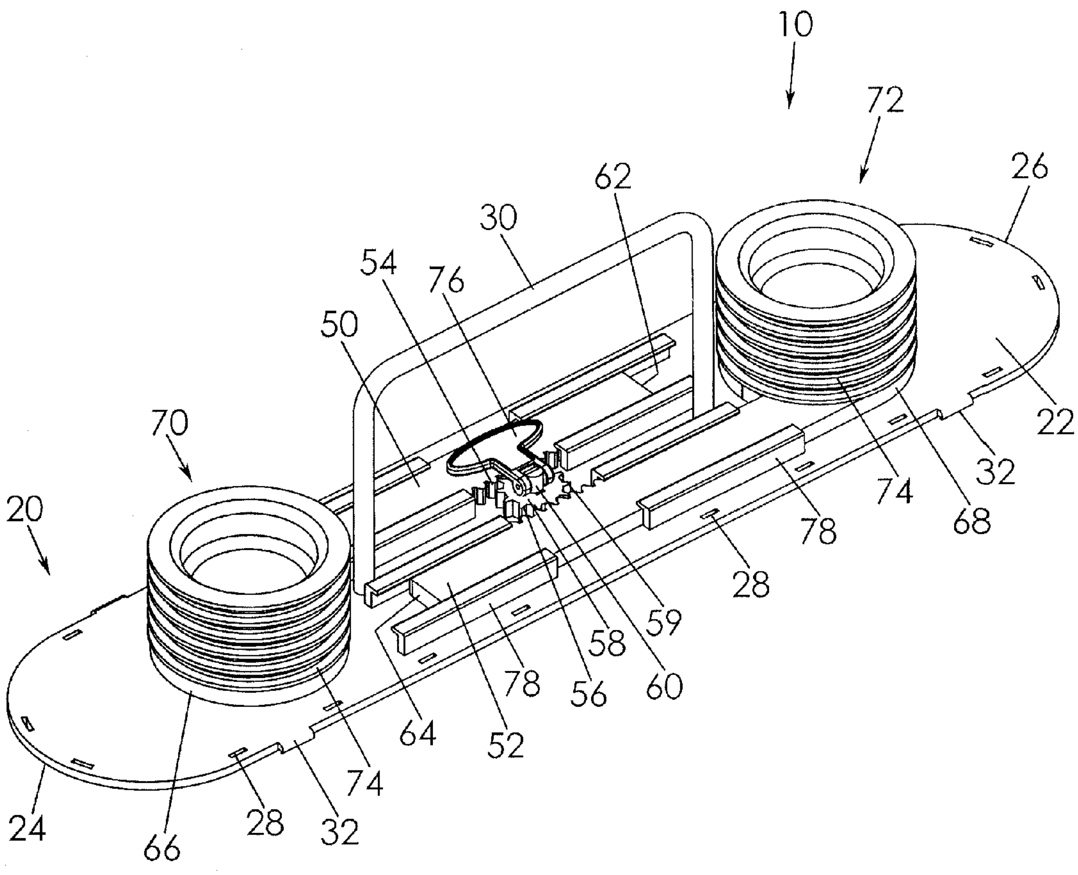
FIG. 2 is a perspective view of the chain carrying device as in FIG. 1 removed from the carrying case perspective view of the chain carrying device as in FIG. 1 with an actuation lever in a stop configuration.
Figure 3:
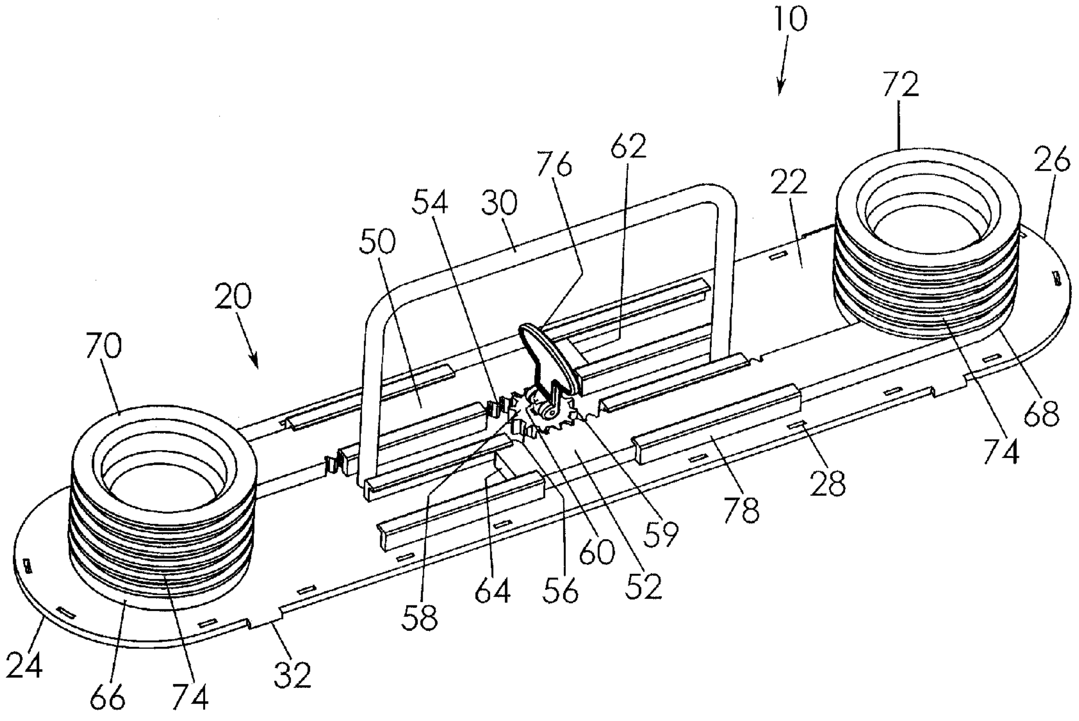
FIG. 3 is another perspective view of the chain carrying device as in FIG. 2 with an actuation lever in a use configuration.
Figure 4A:
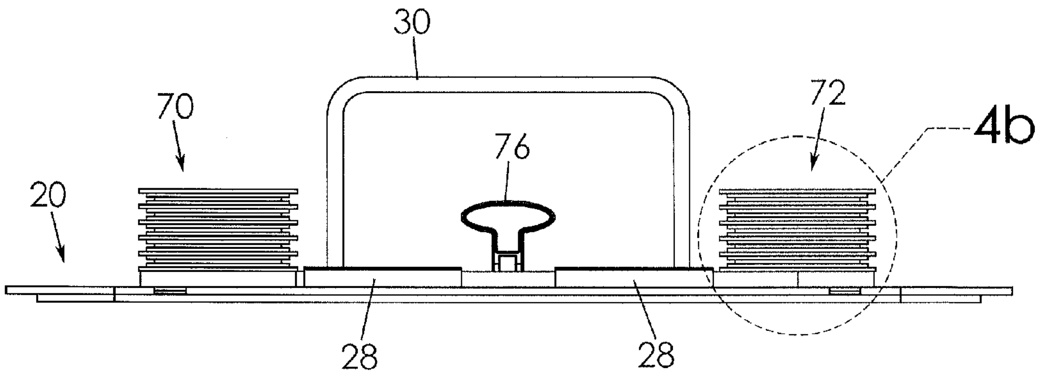
FIG. 4*a* is a side view of the chain carrying device as in FIG. 2.
Figure 4B:
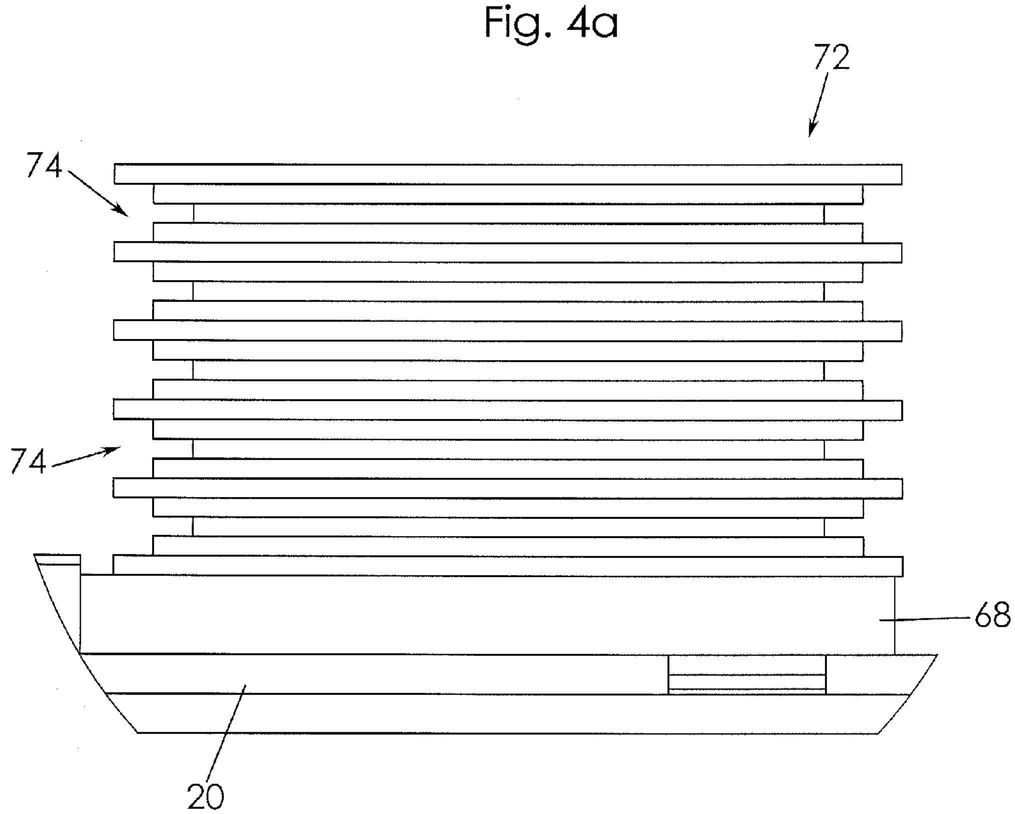
FIG. 4*b* is an isolated view on an enlarged scale taken from FIG. 4*a*.
Figure 5:
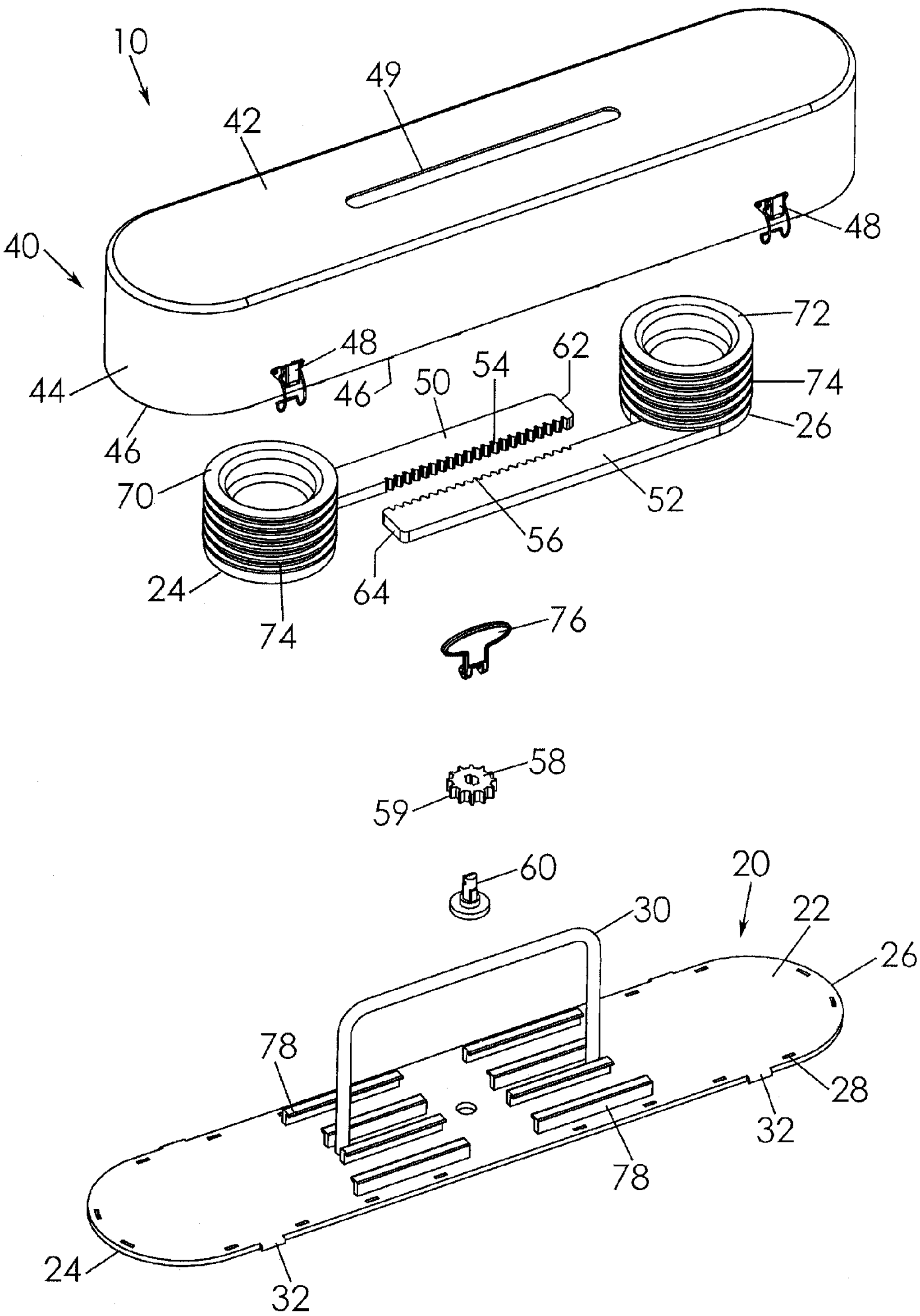
FIG. 5 is an exploded view of the chain carrying device of FIG. 1.

The chain carrying device 10 includes first 50 and second 52 adjustment members positioned on the upper surface 22 of the base member 20 but not coupled thereto (FIGS. 2 *and* 3). In other words, the adjustment members 50, 52 are movable on the upper surface 22 as will be described below. The adjustment members 50, 52 are situated parallel to but displaced from one another. An actuator 58 is mounted to the base member upper surface 22 and is situated between the first 50 and second 52 adjustment member. More particularly, the actuator 58 may be mounted to a securing bracket 60 and configured to be rotatable relative to the base member 20. The actuator 58 is operatively coupled to the first 50 and second 52 adjustment members and configured to move the adjustment members 50, 52 in opposite directions along the base member upper surface 22 when actuated/rotated.

More particularly, each adjustment member 50, 52 includes a proximal end 62, 64 substantially adjacent the actuator 58 and opposed distal ends 66, 68 displaced from the actuator 58 (FIG. 2). Each adjustment member 50, 52 includes a plurality of adjustment teeth 54, 56 along respective inwardly positioned edges extending along the respective inward edges from respective proximal ends. In other words, respective adjustment teeth 54, 56 are substantially adjacent respective proximal ends 62, 64 thereof. Further, the actuator 58 is a gear having a plurality of actuation teeth 59 about an operational edge thereof configuration. The actuation teeth 59 have a configuration complementary to the adjustment teeth 54, 56 and the actuator 58 is positioned such that the actuator 58 mate with the adjustment teeth 52, 56. A rotation of the actuator 58, then, causes the adjustment members 50, 52 to move in opposite directions, the direction of adjustment member movement depending on the direction of actuator rotation. In operation, rotation of the actuator 58 in a first direction moves the adjustment members 50, 52 toward a reduced length configuration and rotation of the actuator 58 in a second direction moves the adjustment members 50, 52 toward an expanded length configuration. The actuator 58 and adjustment members 50, 52 may be a rack and pinion gear apparatus.

The chain carrying device 10 may include first 70 and second 72 chain holding members each coupled to a respective distal end 66, 68 of a respective adjustment member 54, 56. Each chain holding member 70, 72 includes a generally cylindrical configuration and extends upwardly from respective distal ends 66, 68 (FIG. 2). More particularly, each chain holding member 70, 72 includes a plurality of slots 74 (which may also be referred to as grooves, recesses, or channels) extending radially about an outer surface of a single cylindrical side wall and separate from an adjacent slot 74. It is understood that each slot 74 is configured to receive a chain, such as a chainsaw blade chain, thereabout such that the chain extends between corresponding slots of the chain holding member 70, 72. Therefore, each chain held by the chain holding member 70, 72 is separated from each other chain held thereby.

The actuator 58 may include a lever 76 operatively coupled to one of the bracket 60 or directly to the actuator 58 such that rotational movement of the lever 76 causes operative rotation of the actuator 58 and, as a result, opposing linear movement of the adjustment members 80, 52 as described above. Preferably, the lever 76 is pivotally coupled to the actuator 58 and movable between an upright use configuration (FIG. 3) and a folded stop configuration (FIG. 2). The lever 76, bracket 60, and actuator 58 are configured such that rotation of the actuator 58 is not possible when the lever 76 is at the stop configuration, either because pivotal movement to the stop configuration moves the actuation teeth out of interaction with the adjustment teeth 54, 56 or because the lever 76 is simply not able to be grasped and rotated by a user. The lever 76 may be a cam lock that disables operation (i.e. rotation) when positioned at a locked configuration.

A plurality of guide members 78 may be fixedly and strategically mounted to the base member upper surface 22 adjacent first 50 and second 52 adjustment members. The guide members 78 are configured to receive respective adjustment members 50, 52 and to direct them in slidable movement toward reduced length and expanded length configurations as described above. Each guide member 78 may include an inverted L-shaped configuration with the open side directed to the inside toward the actuator 58 as shown in FIG. 2.

In use, a chain saw cutting blade type chain or other type of chain may be looped around first 70 and second 72 chain holding members and situated and corresponding slots 74. Multiple chains may be likewise situated since the chains are each separable from one another according to the adjacent slot configuration. A user may operate the lever 76 in the upstanding configuration to rotate the actuator 58 and, as a result, operate the adjustment members 50, 52 to move toward the expanded length configuration in order to put tension on the stored chains such that the chains maintain their separated positions and do not become tangled. Conversely, if the chains do not fit on the chain holding devices as positioned, the lever 76 may be operated so as to rotate the actuator 58 in a reverse direction so as to operate the adjustment members 50, 52 toward the reduced length configuration. When all adjustments have been made, the lever 76 may be moved to the folded stop configuration to prevent unintended movement. The carrying case 40 may be fastened to the base member 20 as described above and the entire device 10 carried by the handle 30.

It is understood that while certain forms of this invention have been illustrated and described, it is not limited thereto except insofar as such limitations are included in the following claims and allowable functional equivalents thereof.

What is claimed is:

1. A length adjustable chain carrying device, comprising:

a base member having a fixed length;

first and second adjustment members positioned on an upper surface of said base member and configured to move linearly thereon, said second adjustment member being parallel to said first adjustment member;

an actuator rotatably mounted to said base member upper surface and situated intermediate said first and second adjustment members, said actuator being operatively coupled to said first and second adjustment members and configured to move said first and second adjustment members in opposite linear directions along said base upper surface when actuated;

first and second chain holding members coupled to distal ends of said first and second adjustment members, respectively;

wherein each said first and second chain holding member includes an upstanding cylindrical configuration defining a plurality of slots configured to receive a chain thereabout:

wherein:

said first and second adjustment members each include a proximal end opposite a respective distal end and defining a plurality of adjustment teeth along an inwardly facing edge adjacent said proximal end; and said actuator is a pinion gear defining a plurality of actuation teeth configured to mate with said adjustment teeth, wherein rotation of said actuator in a first direction moves said first and second adjustment members toward a reduced length configuration and rotation of said actuator in a second direction moves said first and second adjustment member toward an expanded length configuration;

said actuator and said first and said second adjustment members are a rack and pinion gear apparatus;

said actuator includes a lever having a configuration to be selectively grasped and rotated by a user so as to rotate said actuator;

said lever is pivotally coupled to said actuator and movable between an upright use configuration and a folded stop configuration.

2. The chain carrying device as in claim 1, wherein said lever includes a cam lock configured to permit selective rotation of said actuator at said upright use configuration and not to prevent selective rotation of said actuator at said folded stop configuration.

3. The chain carrying device as in claim 1, further comprising a plurality of guide members strategically mounted to said base upper surface adjacent respective first and second adjustment members, each guide member being configured to slidably receive a respective adjustment member and permit said respective adjustment member to slide therealong.

4. The chain carrying device as in claim 3, wherein each guide member includes a generally inverted L-shape configuration by which to guide a respective adjustment member between said reduced length configuration and said expanded length configuration.

5. The chain carrying device as in claim 1, wherein each said chain holding member is configured to selectively retain more than one chain.

6. The chain carrying device as in claim 5, wherein each slot of said plurality of slots is configured to separate a respective chain from an adjacent chain.

7. A length adjustable chain carrying device comprising:

a base member having a fixed length;

first and second adjustment members positioned on an upper surface of said base member and configured to move linearly thereon, said second adjustment member being parallel to said first adjustment member;

an actuator rotatably mounted to said base member upper surface and situated intermediate said first and second adjustment members, said actuator being operatively coupled to said first and second adjustment members and configured to move said first and second adjustment members in opposite linear directions along said base upper surface when actuated;

first and second chain holding members coupled to distal ends of said first and second adjustment members, respectively; and wherein each said first and second chain holding member includes an upstanding cylindrical configuration defining a plurality of slots configured to receive a chain thereabout;

a carrying case that includes a cover having a configuration complementary to a configuration of said base member, said cover being releasably coupled to said base member wherein:

said carrying case includes a top wall and a plurality of side walls extending downwardly from said top wall; and said side walls are releasably coupled to said base member with fasteners:

a handle attached to said base member and extending upwardly;

wherein: said carrying case includes a top wall and a plurality of side walls extending downwardly from said top wall; said sde walls are releasably coupled to said base member with fasteners; and said top wall defines an opening having a configuration complementary to a configuration of said handle such that said handle is received through said carrying case slot when said carrying case is coupled to said base member.

8. The carrying device as in claim 7, wherein:

said first and second adjustment members each include a proximal end opposite a respective distal end and defining a plurality of adjustment teeth along an inwardly facing edge adjacent said proximal end;

said actuator is a pinion gear defining a plurality of actuation teeth configured to mate with said adjustment teeth, wherein rotation of said actuator in a first direction moves said first and second adjustment members toward a reduced length configuration and rotation of said actuator in a second direction moves said first and second adjustment member toward an expanded length configuration;

said carrying case includes a top wall and a plurality of side walls extending downwardly from said top wall;

said side walls are releasably coupled to said base member with fasteners;

said top wall defines an opening having a configuration complementary to a configuration of said handle such that said handle is received through said carrying case slot when said carrying case is coupled to said base member;

each said chain holding member is configured to selectively retain more than one chain; and each slot of said plurality of slots is configured to separate a respective chain from an adjacent chain.

* * * * *